US009183362B2

(12) United States Patent
Thompson (10) Patent No.: US 9,183,362 B2
(45) Date of Patent: Nov. 10, 2015

(54) METHOD AND SYSTEM FOR VERIFICATION OF HUMAN PRESENCE AT A MOBILE DEVICE

(75) Inventor: Fraser Thompson, Los Angeles, CA (US)

(73) Assignee: MOBILE MESSENGER GLOBAL, INC., Los Angeles, CA (US)

( * ) Notice: Subject to any disclaimer, the term of this patent is extended or adjusted under 35 U.S.C. 154(b) by 0 days.

(21) Appl. No.: 13/567,537

(22) Filed: Aug. 6, 2012

(65) Prior Publication Data

US 2013/0205386 A1 Aug. 8, 2013

Related U.S. Application Data

(60) Provisional application No. 61/574,557, filed on Aug. 5, 2011.

(51) Int. Cl.
*G06F 21/31* (2013.01)

(52) U.S. Cl.
CPC ........ *G06F 21/31* (2013.01); *G06F 2221/2133* (2013.01)

(58) Field of Classification Search
CPC ......... G06F 21/30; G06F 21/31; G06F 21/36; G06F 2221/2133; H04L 63/083; H04L 63/0838
USPC ............................................. 726/17; 713/182
See application file for complete search history.

(56) References Cited

U.S. PATENT DOCUMENTS

| | | | |
|---|---|---|---|
| 8,019,127 B2* | 9/2011 | Misra | 382/115 |
| 8,036,902 B1* | 10/2011 | Strom et al. | 704/275 |
| 8,417,791 B1* | 4/2013 | Peretz et al. | 709/217 |
| 8,671,058 B1* | 3/2014 | Isaacs | 705/50 |
| 2007/0143624 A1* | 6/2007 | Steeves | 713/182 |
| 2007/0192849 A1* | 8/2007 | Golle et al. | 726/16 |
| 2008/0209223 A1* | 8/2008 | Nandy et al. | 713/185 |
| 2009/0328163 A1* | 12/2009 | Preece | 726/5 |
| 2010/0100725 A1* | 4/2010 | Ozzie et al. | 713/155 |
| 2010/0229223 A1* | 9/2010 | Shepard et al. | 726/5 |
| 2010/0318669 A1* | 12/2010 | Chugh | 726/5 |
| 2011/0209076 A1* | 8/2011 | Saxena et al. | 715/764 |
| 2012/0254971 A1* | 10/2012 | Hu et al. | 726/9 |
| 2012/0272302 A1* | 10/2012 | Zhu et al. | 726/6 |
| 2012/0323700 A1* | 12/2012 | Aleksandrovich et al. | 705/14.69 |
| 2013/0042309 A1* | 2/2013 | Ozzie et al. | 726/5 |
| 2014/0250538 A1* | 9/2014 | Rapaport et al. | 726/28 |

OTHER PUBLICATIONS

Almazyad et al., "Multi-Modal CAPTCHA: A User Verification Scheme", 2011, IEEE, pp. 1-7.*
Xu et al., "Mandatory Human Participation: A New Authentication Scheme for Building Secure Systems", 2003, IEEE, pp. 547-552.*

* cited by examiner

*Primary Examiner* — Matthew Smithers
(74) *Attorney, Agent, or Firm* — Arent Fox LLP (57) ABSTRACT

A method and system is provided for verifying human presence at a mobile device. The method includes receiving a request for verification. Further, the method includes sending a Completely Automated Public Turing test to tell Computers and Humans Apart (CAPTCHA) challenge to the mobile device. Further, the method includes receiving a response to the CAPTCHA challenge. Finally, the method includes verifying the human presence by matching the response received to the CAPTCHA challenge sent.

20 Claims, 6 Drawing Sheets

METHOD AND SYSTEM FOR VERIFICATION OF HUMAN PRESENCE AT A MOBILE DEVICE

RELATED APPLICATIONS

This application claims the benefit of U.S. Provisional Application No. 61/574,557 titled "Method and System for Verifying that a Human is Present at a Mobile Device" filed on Aug. 5, 2011, the entire contents of which are incorporated by reference herein.

BACKGROUND OF THE INVENTION

1. Field of the Invention

The present invention relates to verification on internet in general. More specifically, the present invention relates to a method and system for verification of human presence at a communication device.

2. Description of the Prior Art

Computer systems are capable of mimicking human interactions with other computers. One computer can be programmed to fill in forms, submit those forms, and generally behave in an automated way to accomplish certain tasks, especially in on-line forums like bulletin boards, blogs, online polls, commerce sites, and so forth. While many such automation tasks are benign and even helpful, the same technology can be used to automate fraud and/or attacks. In response to increasing automated attacks, the concept of verification by sending a random PIN to a mobile device was conceived. For example, to verify that a transaction on a website is being made by authorized user, the user is sent a randomly generated PIN to his registered mobile device. The user is then required to enter the PIN on the website to complete the transaction. For example, for verifying that humans are present at the opt-in for mobile phone transactions, such as mobile payments, purchases by mobile phone, prepaid card top-ups, premium mobile content subscription opt-ins, standard-rated mobile messaging campaign opt-ins and the like.

Sending a PIN to a mobile device, and requiring the user to enter the PIN into the website, is thought to be a superior level of authentication than sending a PIN to an email address, since this PIN-to-mobile technique verifies that the human user also is in possession of his mobile phone, elevating the phone itself to the role of physical token security factor. Normally, PINs are sent via test message to mobile devices, and the presumption is that human user reads the PIN number and then copies it into the website.

But with the advent of smart phones designed on open platforms such as Android, mobile phones themselves have the capability of copying PIN numbers from text messages and entering those PIN numbers onto websites, unbeknownst to any user. The mobile devices are also capable of being affected by virus and malware. Therefore there lies a risk of text messages being monitored and used to make unauthorized transactions.

In the light of the foregoing discussion, there is a need for a method and system for increasing the security to ensure human authentication of mobile transactions. Thus, there is a need for a method and system that can verify human presence at a mobile device.

SUMMARY

Accordingly, it is an object of the present invention to provide a method and system for increasing the security of transactions involving mobile transactions or website or digital authentications.

It is yet another object of the present invention to provide a method and system for requiring human presence at a mobile device. The above and other objects of the present invention are achieved by providing a method and system for verifying human presence at a mobile device. The method includes receiving a request for verification, where the request is received from a user. Further, the method includes sending a CAPTCHA (Completely Automated Public Turing test to tell Computers and Humans Apart) challenge to the communication device of the user. Further, the method includes receiving a response to the CAPTCHA challenge, where the response is sent by the user. Finally, the method includes verifying the human presence by matching the response received to the CAPTCHA challenge sent.

BRIEF DESCRIPTION OF THE DRAWINGS

For a more complete understanding of the present invention, the needs satisfied thereby, and the objects, features, and advantages thereof, reference now is made to the following description taken in connection with the accompanying drawings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Before describing in detail the particular method and system for verifying human presence at a mobile device in accordance with an embodiment of the present invention, it should be observed that the present invention resides primarily in combinations of method and system components related to computing device of the present invention.

Accordingly, the system components have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as 'first' and 'second', and the like may be used solely to distinguish one entity or action from another entity or action without necessarily requiring or implying any actual such relationship or order between such entities or actions. The terms 'comprises', 'comprising', or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by 'comprises . . . a' does not, without more constraints, preclude the existence of additional identical elements in the process, method, article, or apparatus that comprises the element.

The terms "mobile device" and "communication device" have been used interchangeably, and refer to computing device which has the capability of communicating or interacting with its users.

The present invention provides a method and system for verifying human presence at a mobile device. The method includes receiving a request for verification, where the request is received from a user. Further, the method includes sending a CAPTCHA (Completely Automated Public Turing test to tell Computers and Humans Apart) challenge to the communication device of the user. Further, the method includes receiving a response to the CAPTCHA challenge, where the response is sent by the user. Finally, the method includes verifying the human presence by matching the response received to the CAPTCHA challenge sent.

Figure 1:
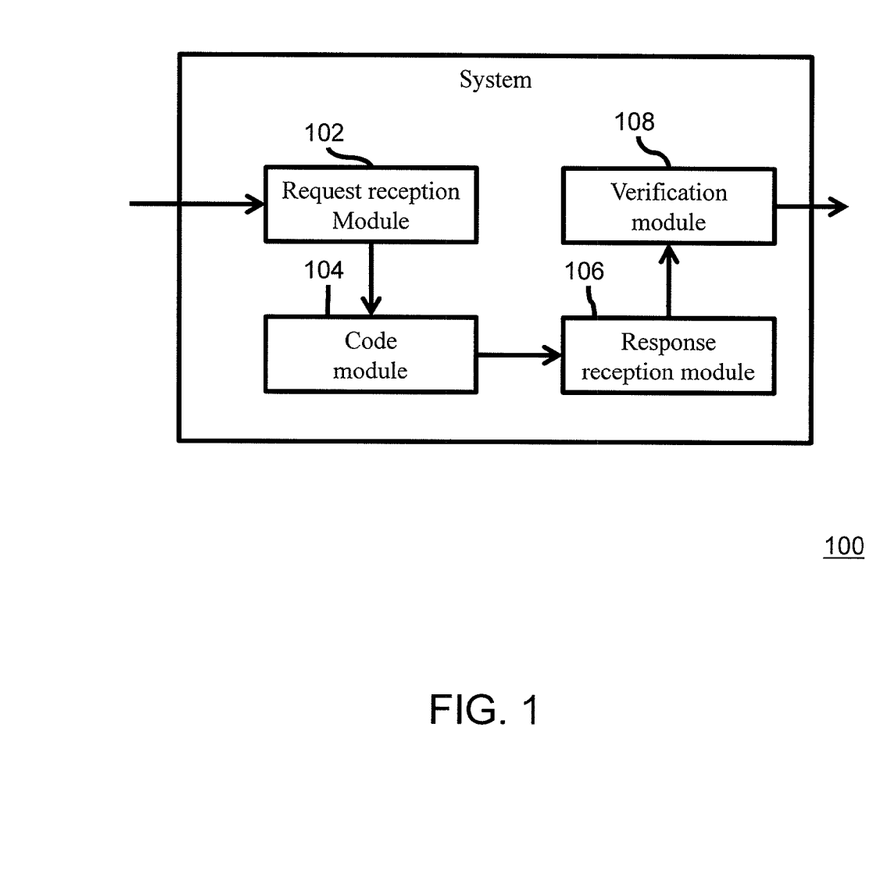
FIG. 1 shows a block diagram of a system for verifying human presence at a mobile device, in accordance with an embodiment of the present invention.

FIG. 1 shows a block diagram of a system 100 for verifying human presence at a mobile device, in accordance with an embodiment of the present invention. Examples of the mobile device include, but are not limited to, a desktop computer, a laptop, a mobile phone, a tablet PC, a netbook, an e-book reader and a PDA. The system 100 includes a request reception module 102, a code module 104, a response reception module 106 and a verification module 108. The request reception module 102 receives a request for verification, where the request is received from a user. In an embodiment, the user accesses a web portal or a mobile application, and is asked for verification to complete a transaction. The web portal or the mobile application sends the request for verification to the system 100 via web server or Internet. On receiving the request for verification, the code module 104 sends a CAPTCHA (Completely Automated Public Turing test to tell Computers and Humans Apart) challenge to the communication device of the user. In an embodiment of the present invention, the code module 104 sends the CAPTCHA challenge via a multi-media message (MMS), a SMS, a voice call, an Email, one-time internet or URL hyperlink, a WAP push, an alert sent via a smart phone app, and a video call to the mobile device of the user. Examples of the CAPTCHA challenge include, but are not limited to, one or more of an image, a video, a question, a word, a phrase, a number, a motion, an interaction, an audio and a vibration.

In an embodiment of the present invention, the code module 104 includes a code generation module for generating the CAPTCHA challenge. The code generation module generates the CAPTCHA challenge by one of random rules and pre-specified rules. In another embodiment of the present invention, the code module 104 includes a code reception module for sending the CAPTCHA challenge generated by a third party server. In this case, the code module 104 uses APIs of a third party CAPTCHA generating server to send the CAPTCHA challenge.

The response reception module 106 receives a response to the CAPTCHA challenge. The response is manually entered by the user of the mobile device. In an embodiment, the response is entered in the same web portal or mobile application from where the request for verification was generated. Finally, the verification module 108 verifies the human presence by matching the response received to the CAPTCHA challenge sent. In an embodiment of the present invention, the verification module 108 matches the response to expected response of the CAPTCHA challenge. In another embodiment of the present invention, the verification module 108 sends the response to the third party server which generated the CAPTCHA challenge.

Figure 2:
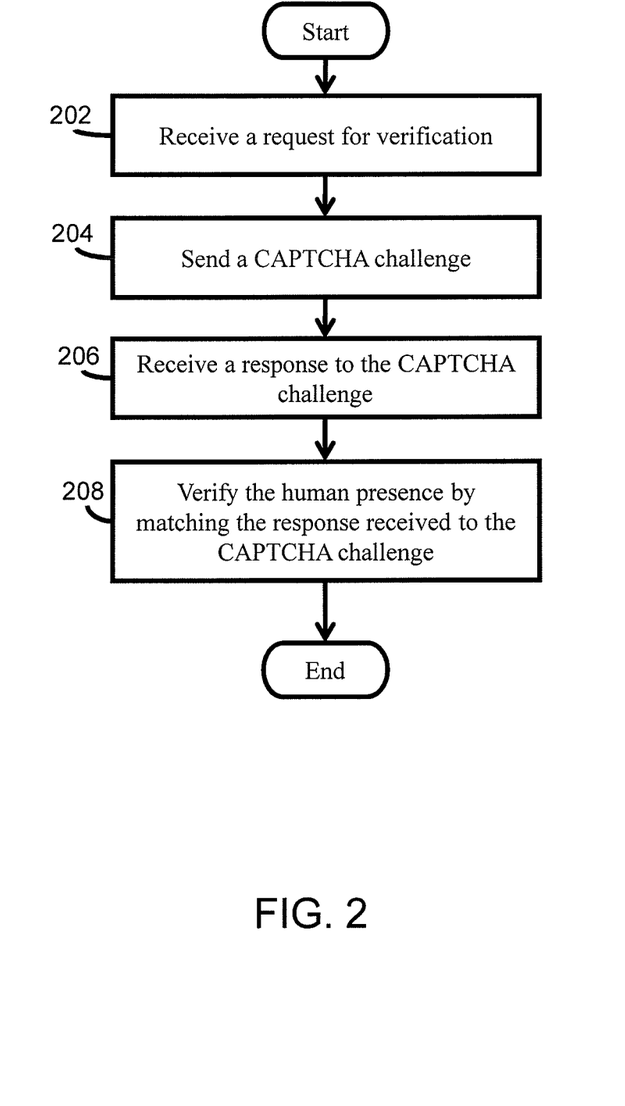
FIG. 2 shows a flow chart of a method for verifying human presence at a mobile device, in accordance with another embodiment of the present invention.

FIG. 2 shows a flow chart of a method for verifying human presence at a mobile device, in accordance with another embodiment of the present invention. At step 202, the system 100 receives a request for verification. For example, a user may initiate a transaction on a web portal or a mobile application, and may be asked for verification to complete the transaction. Examples include mobile phone transactions, such as mobile payments, purchases by mobile phone, pre-paid card top-ups, premium mobile content subscription opt-ins, standard-rated mobile messaging campaign opt-ins and the like. The web portal or the mobile application sends the request for verification to the system 100 via web server or Internet. At step 204, the system 100 sends a CAPTCHA challenge to the communication device of the user. In an embodiment of the present invention, the CAPTCHA challenge is sent via a multi-media message (MMS), a SMS, a voice call, an Email and a video call to the mobile device of the user. Examples of the CAPTCHA challenge include, but are not limited to, one or more of an image, a video, a question, a word, a phrase, a number, a motion, an interaction, an audio and a vibration. At step 206, the system 100 receives a response to the CAPTCHA challenge, where the response is sent by the user. The response may be manually entered by the user of the mobile device. In an embodiment, the response may be entered in the same web portal or mobile application from where the request for verification was generated. Finally, at step 208, the system 100 verifies the human presence by matching the response received to the CAPTCHA challenge sent. In an embodiment of the present invention, the response is matched to expected response of the CAPTCHA challenge. In another embodiment of the present invention, the response may be sent to a third party server that generated the CAPTCHA challenge.

Figure 3:
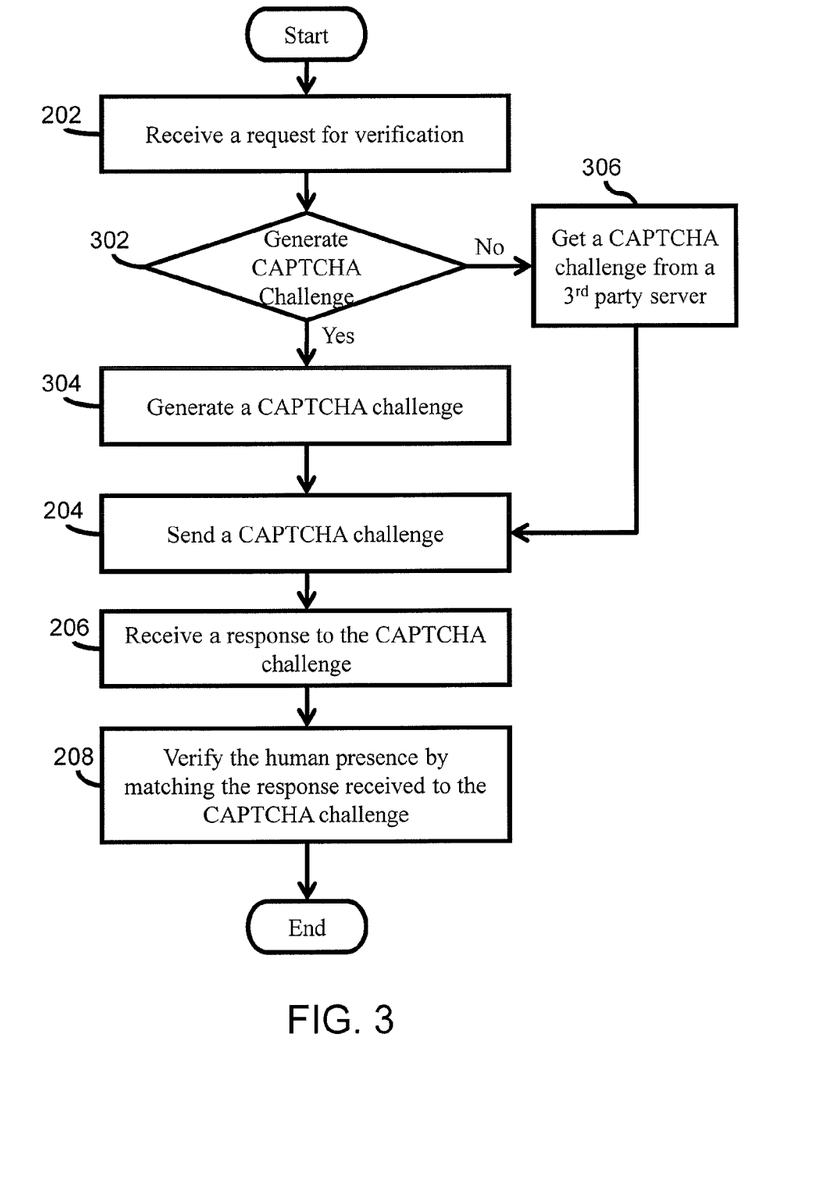
FIG. 3 shows a flow chart of a method for verifying human presence at a mobile device, in accordance with an embodiment of the present invention.

FIG. 3 shows a flow chart of a method for verifying human presence at a mobile device, in accordance with an embodiment of the present invention. At step 202, the system 100 receives a request for verification. At step 302, it is checked if a CAPTCHA challenge can be generated by the system 100. In an embodiment, the system 100 is capable of generating a CAPTCHA challenge. At step 304, the system 100 generates a CAPTCHA challenge. In another embodiment of the present invention, the system 100 is not capable of generating a CAPTCHA challenge. At step 306, the system 100 requests a CAPTCHA challenge from a third party server. The system 100 uses APIs of a third party CAPTCHA generating server to send the CAPTCHA challenge. At step 204, the system 100 sends the CAPTCHA challenge to the communication device of the user. In an embodiment of the present invention, the CAPTCHA challenge is sent via a multi-media message (MMS), a WAP push, a hyperlink embedded in a message, a mobile alert delivered via a smart phone or tablet app, a SMS, a voice call, an Email and a video call to the mobile device of the user. Examples of the CAPTCHA challenge include, but are not limited to, one or more of an image, a video, a question, a motion, an interaction, an audio and a vibration. At step 206, the system 100 receives a response to the CAPTCHA challenge, where the response is sent by the user. The response is manually entered by the user of the mobile device. In an embodiment, the response is entered in the same web portal or mobile application from where the request for verification was generated. Finally, at step 208, the system 100 verifies the human presence by matching the response received to the CAPTCHA challenge sent. In an embodiment of the present invention, the response is matched to expected response of the CAPTCHA challenge. In another embodiment of the present invention, the response is sent to the third party server which generated the CAPTCHA challenge.

Figure 4:
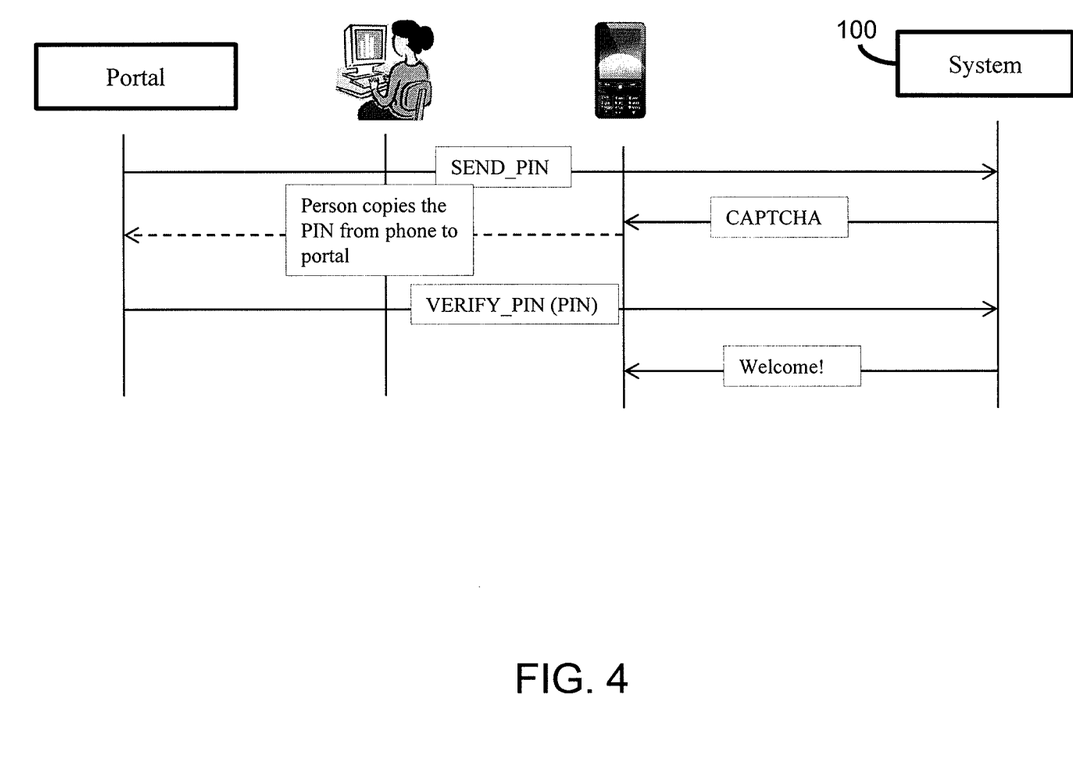
FIG. 4 illustrates a process flow for verifying human presence at a mobile device, in accordance with an embodiment of the present invention.

FIG. 4 illustrates a process flow for verifying human presence at a mobile device, in accordance with an embodiment of the present invention. A user logs into a portal and makes a transaction by entering mobile phone number on the portal. The portal then sends a verification request to the system 100. The system 100 then sends a CAPTCHA challenge to the mobile phone number entered by the user. The user then interprets the CAPTCHA and enters the response to the portal. The portal then sends the response back to the system 100 for verification. Finally, the system 100 verifies transaction by matching the CAPTCHA response with the expected response to the CAPTCHA challenge.

Figure 5:
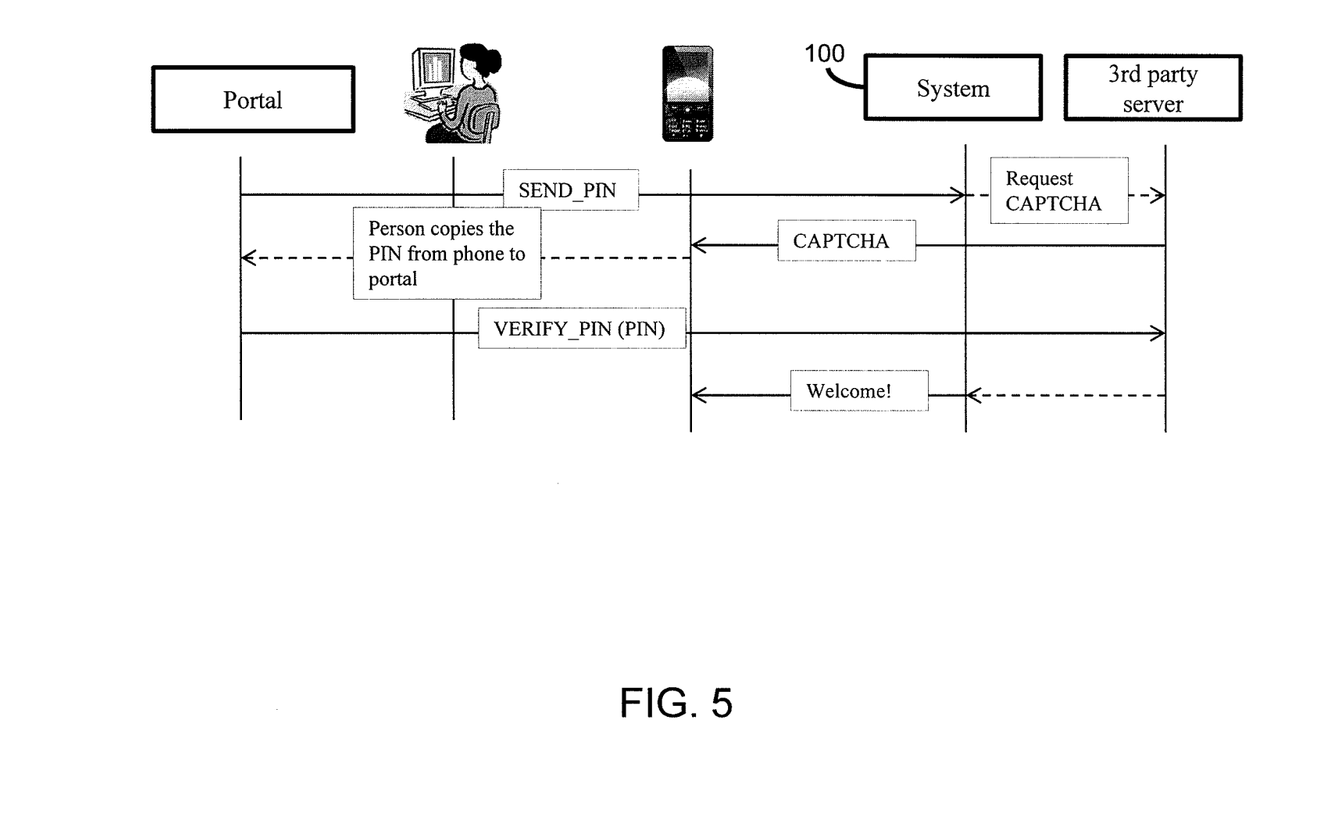
FIG. 5 illustrates a process flow for verifying human presence at a mobile device, in accordance with another embodiment of the present invention.

FIG. 5 illustrates a process flow for verifying human presence at a mobile device, in accordance with another embodiment of the present invention. A user logs into a portal and makes a transaction by entering mobile phone number on the portal. The portal then sends a verification request to the system 100. The system 100 then requests a third party server to generate a CAPTCHA challenge. The system 100 then sends a CAPTCHA challenge to the mobile phone number entered by the user. The user then interprets the CAPTCHA and enters the response to the portal. The portal then sends the response back to the system 100 for verification. Finally, the system 100 verifies transaction at the third party server by matching the CAPTCHA response with the expected response to the CAPTCHA challenge.

Figure 6:
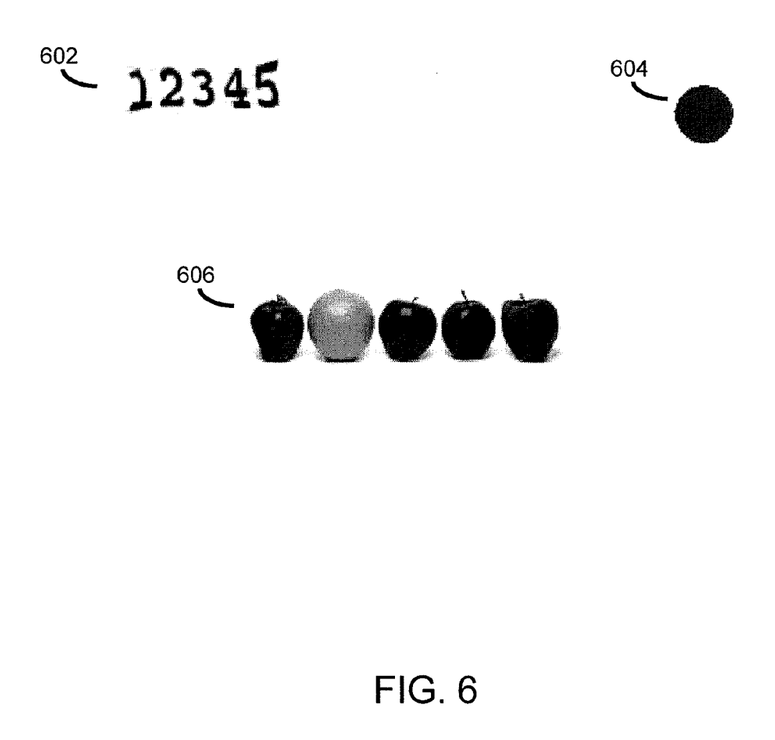
FIG. 6 shows examples of human interpretable challenges, in accordance with an embodiment of the present invention.

FIG. 6 shows examples of human interpretable challenges, in accordance with an embodiment of the present invention. The FIG. 6 shows CAPTCHA challenges 602, 604 and 606. Namely, in the case of a web-landing page opt-in, in which the transaction commences with a user entering the cell phone number on a web page, and then requires them to verify by entering a PIN that has been sent to the mobile device, under the present invention, the PIN number sent in graphical form that can be read only by a human user. Likewise, an MO opt-in campaign can use this same verification technique. By requesting an Opt-in, and user can be presented with an MMS MT containing a picture, sound or video. By verifying some quality of the picture, video, or sound back via MO, the users has again utilized this more advanced authentication technique. The CAPTCHA challenge 602 shows that rather than sending the cell phone an SMS message with the PIN number "12345," under the present invention, the user would receive an MMS message containing the PIN number within a human-readable graphic.

The type of multimedia can change (image, sound, video, vibration) and the contents of those images and videos and sounds can change. The images for example may be of numbers, objects, colours, shapes etc. Likewise video, sound, and other multimedia can vary in its form. The "human present" test can take other forms, such as asking the human to respond to simple questions about graphics such as asking color of the dot in the CAPTCHA challenge 604 or by asking the type of the object that does not belong to the CAPTCHA challenge 606. This use of MMS to verify human authentication can include, images, sounds, videos and other multimedia events such as discerning the haptic vibration pattern a phone is making. Such graphical images are human-readable images of language, numbers, shapes or other information that takes substitutes for the function of a unique one-time personal identification number.

While the present invention has been described in connection with preferred embodiments, it will be understood by those skilled in the art that variations and modifications of the preferred embodiments described above may be made without departing from the scope of the invention. Other embodiments will be apparent to those skilled in the art from a consideration of the specification or from a practice of the invention disclosed herein. It is intended that the specification and the described examples are considered exemplary only, with the true scope of the invention indicated by the following claims.

What is claimed is:

1. A method for authentication of a human at a communication device, the method comprising:
   receiving, via a first communication device of the human, a request for authentication of the human at a second communication device;
   sending a Completely Automated Public Turing test to tell Computers and Humans Apart (CAPTCHA) challenge to the first communication device;
   receiving a response to the CAPTCHA challenge, the response being received at one of the first and second communication device; and
   authenticating the human upon a positive match between the response received to the CAPTCHA challenge sent.

2. The method recited in claim 1, wherein sending the CAPTCHA challenge comprises generating the CAPTCHA challenge.

3. The method recited in claim 1, wherein the CAPTCHA challenge is generated by a third party server.

4. The method recited in claim 1, wherein the CAPTCHA challenge is sent via a multi-media message (MMS), a SMS, a voice call, an Email, and a video call.

5. The method as recited in claim 1, wherein the CAPTCHA challenge is one or more of an image, a video, a question, a motion, an interaction, an audio and a vibration.

6. The method as recited in claim 1, wherein the response is one or more of a text, a voice, a motion and an interaction.

7. The method as recited in claim 1, wherein the first and second communication devices are selected from a group consisting of a desktop, a laptop, a mobile phone, a tablet PC, a netbook, an e-book reader and a PDA.

8. The method as recited in claim 1, wherein the request for authentication is received over internet.

9. The method as recited in claim 1, wherein the request for authentication is received from a web server.

10. The method of claim 1, wherein the request for authentication includes an identification of the communication device.

11. The method of claim 10, wherein the identification is a mobile phone number of the communication device.

12. A system for authentication of a human at a communication device, the system comprising:
   a request reception module for receiving, via a first communication device of the human, a request for authentication of the human at a second communication device;
   a code module for sending a Completely Automated Public Turing test to tell Computers and Humans Apart (CAPTCHA) challenge to the first communication device;
   a response reception module for receiving a response to the CAPTCHA challenge, the response being received at one of the first and second communication device; and
   an authentication module for authenticating the human upon a positive match between the response received to the CAPTCHA challenge sent.

13. The system recited in claim 12, wherein the code module comprises a code generation module for generating the CAPTCHA challenge.

14. The system recited in claim 12, wherein the code module comprises a code reception module for sending the CAPTCHA challenge generated by a third party server.

15. The system recited in claim 12, wherein the code module is capable of sending the CAPTCHA challenge via a multi-media message (MMS), a SMS, a voice call, an Email and a video call.

16. The system as recited in claim 12, wherein the CAPTCHA challenge is one or more of an image, a video, a question, a motion, an interaction, an audio and a vibration.

17. The system as recited in claim 12, wherein the response reception module is capable of receiving the response via one or more of a text, a voice, a motion and an interaction.

18. The system as recited in claim 12, wherein the communication devices are selected from a group consisting of a desktop, a laptop, a mobile phone, a tablet PC, a netbook, an e-book reader and a PDA.

19. The system of claim 12, wherein the request for authentication includes an identification of the communication device.

20. The system of claim 19, wherein the identification is a mobile phone number of the communication device.

\* \* \* \* \*